United States Patent

Michels

Patent Number: 5,505,526
Date of Patent: Apr. 9, 1996

[54] ADJUSTING ACTUAL BRAKE PRESSURE TO MATCH STORED PRESSURE VALUES ASSOCIATED WITH A BRAKE PEDAL POSITION

[75] Inventor: Erwin Michels, Kail, Germany

[73] Assignee: Lucas Industries public limited company, Solihull, United Kingdom

[21] Appl. No.: 325,266

[22] PCT Filed: May 12, 1993

[86] PCT No.: PCT/EP93/01187

§ 371 Date: Oct. 26, 1994

§ 102(e) Date: Oct. 26, 1994

[87] PCT Pub. No.: WO93/24353

PCT Pub. Date: Dec. 9, 1993

[30] Foreign Application Priority Data

May 26, 1992 [DE] Germany .......................... 42 17 409.0

[51] Int. Cl.⁶ .................................................. B60T 13/66
[52] U.S. Cl. .................................................. 303/3; 303/155
[58] Field of Search ..................... 303/3, 15, 20, 303/100, 113.4, 114.1, DIG. 1–DIG. 4, 155, 166

[56] References Cited

U.S. PATENT DOCUMENTS

| | | | |
|---|---|---|---|
| 4,610,484 | 9/1986 | Amberg et al. | 303/100 |
| 4,678,243 | 7/1987 | Leiber | 303/113.4 |
| 4,914,917 | 4/1990 | Schonlau | 303/114.1 X |
| 5,158,343 | 10/1992 | Reichelt et al. | 303/113.4 |

FOREIGN PATENT DOCUMENTS

| | | |
|---|---|---|
| 3943002A1 | 4/1991 | Germany . |
| 9202154 | 5/1992 | Germany . |

*Primary Examiner*—Josie Ballato
*Attorney, Agent, or Firm*—Oblon, Spivak, McClelland, Maier & Neustadt

[57] ABSTRACT

A brake pressure control method in a vehicle brake system equipped with an electronically adjustable brake pressure booster provides that, during a braking operation, a stored design value ($p_{soll}$) of the brake pressure constantly is associated with a respective instantaneous actuating speed ($v_{ped}$) of a brake pedal. The the actual value ($p_{Br}$) of the brake pressure is also measured at this instant and compared with the design value, and as a result, the pressure originating from the brake pressure booster output is adjusted in response to the result of the comparison between the design and actual values, so that the actual value converges to the corresponding design value.

1 Claim, 2 Drawing Sheets

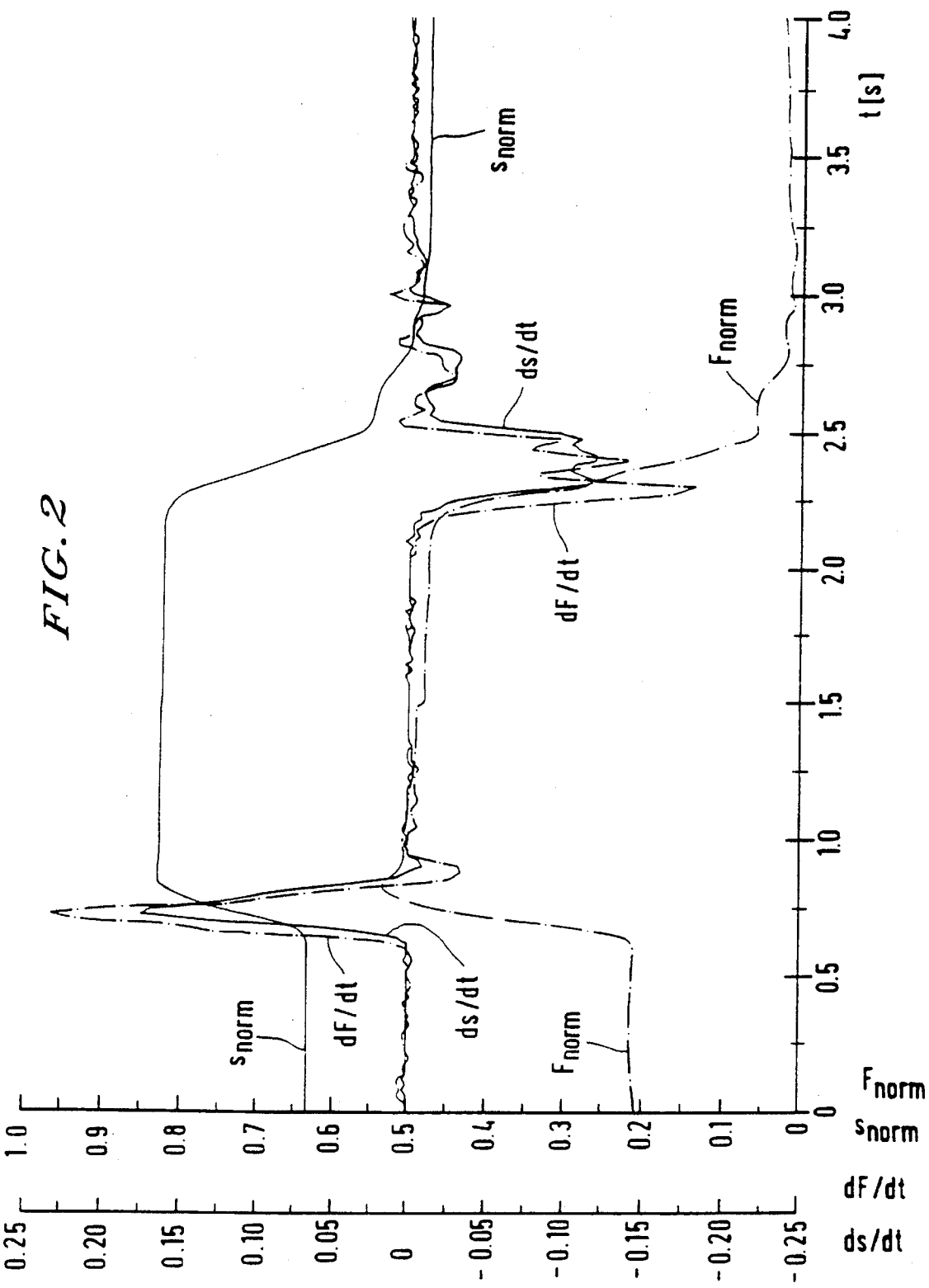

ADJUSTING ACTUAL BRAKE PRESSURE TO MATCH STORED PRESSURE VALUES ASSOCIATED WITH A BRAKE PEDAL POSITION

BACKGROUND OF THE INVENTION

The invention relates to a brake pressure control method in a vehicle brake system equipped with an electronically adjustable brake pressure booster, with which an actuating speed of the brake pedal is determined and brake pressure boosting effected in response to the same.

Such a method is known from DE 40 28 290 C1. In that case it is suggested to shorten the distance to stop a motor vehicle in critical driving situations (especially during so-called panic braking) by drawing upon the actuating speed of the brake pedal as a criterion to release automatic application of the brakes. To accomplish that, a per se known brake pressure booster is used which generates brake pressures at the vehicle brakes which no longer are determined exclusively by the force produced at the pedal by the driver of the vehicle, but instead by other criteria, especially by a comparison between the actuating speed of the brake pedal and a threshold value. If the brake pedal actuating speed surpasses a threshold value, the braking operation is released automatically and brake pressure is built up to a level higher than the pressure that would result from the position of the brake pedal alone.

With this prior art, the brake pressure at the individual vehicle brakes is not controlled but rather regulated. An increased brake pressure is built up in response to the actuating speed of the brake pedal so that additional brake pressure beyond the brake pressure resulting from the instantaneous pedal position of the brake pedal is generated (when the above mentioned threshold value is exceeded), and this pressure, for instance, may be proportional to the maximum actuating speed of the brake pedal which occurred.

Those skilled in the art are familiar with the art of adjusting random or automatically controlled higher pressure values in vehicle brakes, in addition to the hydraulic pressure produced by the master cylinder of a brake system. For example, DE 39 43 002 A1 describes a vehicle brake system comprising a brake pressure booster and another valve, controlled electrically, which is provided in addition to the conventional mechanical operating valve of the brake pressure booster so as to adjust the brake pressure booster (and thus the braking force) in response to control signals provided by a data processing means. DE-GM 92 02 154, too, describes an electronically adjustable brake pressure booster.

In the description below, the above prior art is assumed to be known, especially the art of brake pressure boosters and their electronic control, such as by means of electronically controlled valves is assumed to be known.

In accordance with the prior art, therefore, particularly those means must be started from as being known with which brake pressure boosters, such as boosters operating with a pressure difference, are controllable by means of an additional, electromagnetically operable, control valve such that brake pressure boosting is effected which differs from purely mechanically adjusted brake pressure boosting, differing more specifically in accordance with the electronic control commands for the electromagnetically operable control valve of the brake pressure booster.

Brake pressure control which makes use of a brake pressure booster, ideally, could consist in measuring the force produced by the driver of the vehicle at the brake pedal and deriving a control signal for the brake pressure booster according to a given function, with the aid of this force, and generating corresponding brake pressure at the wheels which are to be retarded (if desired, under the conditions of antilock control). However, it is very expensive to mount a force sensor in addition at the master cylinder of a brake system.

Investigations of the behavior of motor vehicle drivers have shown that in critical driving conditions (particularly during so-called panic braking) involuntary false behavior often occurs. During the initial phase of a braking operation, very frequently the brake pedal, although being applied sufficiently quickly, is not pressed down with full force by many hesitant drivers. That applies also in the case of vehicles equipped with an anti-lock protection system (ABS). Such braking behavior, which is not the optimum, is observed with a great number of drivers for the following reasons: In the initial phase of braking, a relatively small hydraulic reactive force (counter-force) still counters the brake pedal. Such a hydraulic force of reaction is not produced until the pressure rises in the brake system. Therefore, the driver readily increases the actuating speed at the beginning of a braking operation. In the course of the further pedal path, however, the reactive force rises very quickly, and for this reason, once a maximum has been reached, many drivers can be observed to produce a rather rapidly dropping pedal speed. As a rule, distance to stop is given away when the course of pedal actuation is as described.

FR-A-25 74 355 (corresponding to DE 34 44 827) discloses a method of controlling the brake pressure in vehicle brake system with which the braking force is adjusted in accordance with a design characteristic in response to the path of the brake pedal. Brake pressure control in that case is not effected in response to the instantaneous value of the actuating speed of the brake pedal. Rather, a brake pedal actuating speed is measured for the only purpose of adjusting the theoretical characteristic in response to the speed of the brake pedal.

The invention aims at adjusting the pressure originating from the brake pressure booster output of a motor vehicle brake system, equipped with an electronically adjustable brake pressure booster, with simple means so that the best possible braking effect is obtained.

In contrast to the known prior art method of regulating the brake pressure (DE 40 28 290 C1), the instant invention thus teaches to control the brake pressure, i.e. to set a desired theoretical value, measure the actual value, and adapt the actual value to the desired value by passing a corresponding instruction to the brake pressure booster control.

Moreover, the invention is based on the finding that, in order to achieve optimum adjustment of the brake pressure, it is not necessary to measure the input force directly at the brake pressure booster. Instead, good results likewise are obtained in a much simpler way if the actuating speed of the brake pedal is measured. This measurement of the actuating speed of the brake pedal can be accomplished easily by means of known rotational angle sensors which measure the rotation of the brake pedal about its support, when actuated by the driver. The rotational path is related, by a simple geometrical relationship, to the actuating path of the pedal, and the actuating speed of the brake pedal can be calculated by differentiation of the rotational path in response to time.

FIG. 2 illustrates empirical results of the courses in time of factors of interest in braking. Plotted above a common time scale are the standardized path $s_{norm}$, (the inward displacement of the brake pedal) the first derivation (differentiation) of the force above time dF/dt, the first derivation (differentiation) of the path above time ds/dt, and the course of the standardized force $F_{norm}$ (the face applied on the brake pedal). The standardization may be taken from the abscissae shown in FIG. 2. In other words, the course of the path $s_{norm}$ and the course of the force $F_{norm}$ each are standardized on the basis of value 1, the time scale being the same for all magnitudes plotted. FIG. 2 demonstrates the result which, by no means, is a matter of fact, namely that the first derivation of the force above time substantially equals the first derivation of the path above time. This is why the first derivation of the path above time, i.e. the actuating speed of the brake pedal, can be taken as the basis for optimum control of a brake pressure booster with which distance to stop, as mentioned above, no longer is given away nor is an expensive, complicated sensor required for the input force at the brake pressure booster.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 2 illustrates empirical results of the courses in time factors of interest in braking.

An embodiment of the invention will be explained more fully below, with reference to FIG. 1. FIG. 1 diagrammatically shows a functional block diagram of a brake system by means of which the method according to the invention of controlling the brake pressure can be carried out. The various hardware elements of the apparatus are known as such. The invention resides in the particular way of adjusting the individual elements in response to quantities determined so that, on the whole, control of the brake pressure is achieved.

Figure 1:
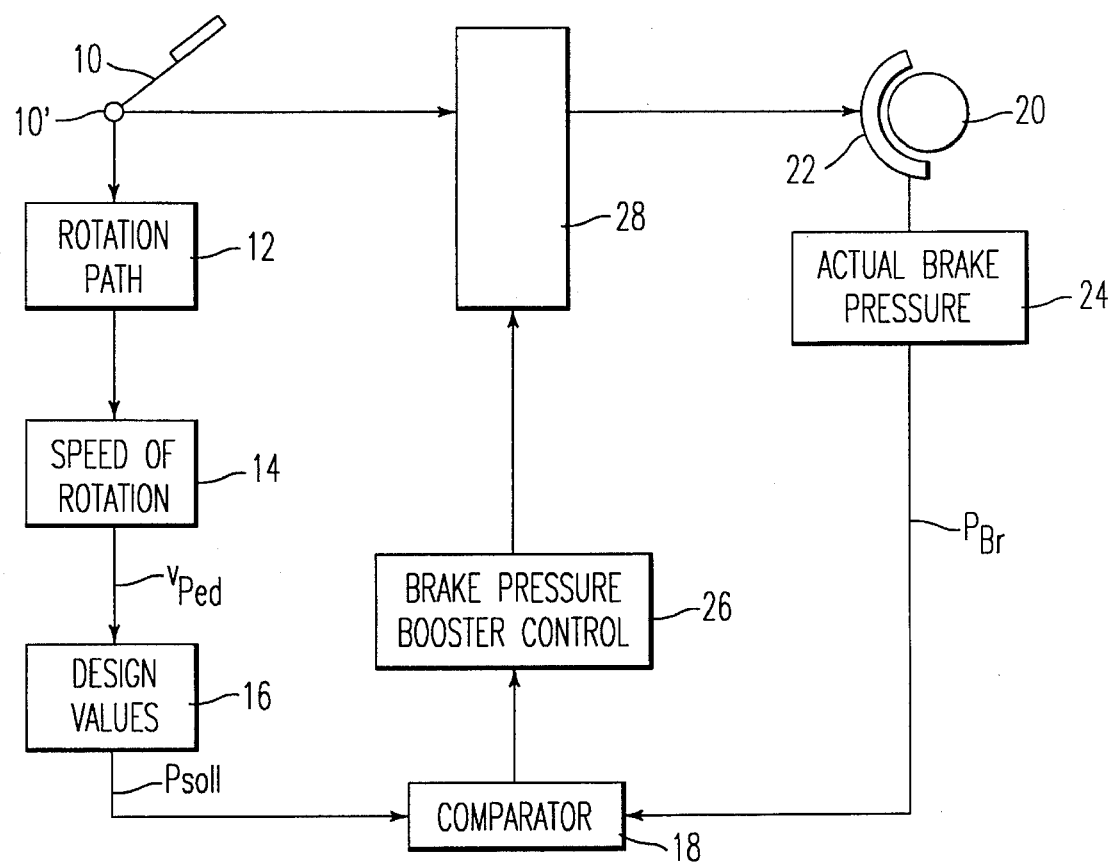
FIG. 1 diagrammatically shows a functional block diagram of the brake system according to the present invention.

A brake pedal 10 is actuated by the driver, i.e. rotated about the support 10'. The rotational path of the pedal, i.e. the angle of rotation of the pedal per unit time is measured by a per se known rotational distance sensor 12. The rotational path measured in dependence upon the time is apportioned so as to determine the so-called first derivation (differentiation) of the rotational path above time, in other words the rotational speed of the pedal 10. A differentiator means 14 is provided to do that. It is obvious, that a separate differentiator 14 is not necessarily required to realize this, since this can also be accomplished in per se known manner by the computer included in ABS equipment (which computer, furthermore, can realize also items 14, 16, 18, and 26).

The rotational velocity (angular speed) of the brake pedal is linked to its actuating speed through a constant factor. Therefore, it is equivalent whether the path velocity or the rotational velocity of the brake pedal are measured. However, measuring the rotational velocity is less costly.

For the sake of simplicity, reference will be made below to the actuating speed of the pedal 10 only, and that also includes the rotational speed as the preferred special case.

The actuating speed $v_{Ped}$ determined in the calculating unit 14 then is processed further so as to obtain signals for adjusting a brake pressure booster. To that end, the respective instantaneous actuating speed $v_{Ped}$ of the brake pedal is determined constantly (continuously) in very small time increments, and a design value as to the brake pressure in the wheel brake of the wheel to be retarded is associated with each instantaneous actuating speed $v_{Ped}$. The wheel which is to be stopped is marked by reference numeral 20 in FIG. 1 and the wheel brake by 22.

The design values were previously memorized and are set for the brake system (which does not mean that they would be invariable; yet they are firmly predetermined for a particular braking operation).

The particular existing value of the actuating speed $v_{Ped}$ of the pedal 10 thus is determined in the manner described above in very small time increments of, for instance, a few milliseconds (2 to 10 ms), and for each of these time increments, a brake pressure design value, previously stored in a memory 16 for the vehicle in question, is associated with the respective instantaneous valued measured of the actuating speed $v_{Ped}$.

Alternatively, an algorithm may be associated with each instantaneous value of the actuating speed $v_{Ped}$, which means that, with this variant, the box 16 in FIG. 1 would symbolize a computing routine according to which a design value would be collated with each instantaneous value of the actuating speed $v_{Ped}$. This collation may be linear, relative to a function (dependency) of the design value from the value of the actuating speed $v_{Ped}$, where the actuating speed $v_{Ped}$ is raised to a higher power, specifically a power greater than 1.

This means that an associated design value $p_{soll}$ is determined constantly for each time increment from the actuating speed $v_{Ped}$, and entered into a comparator 18.

An actual value of the brake pressure $p_{Br}$ is entered into the other input of the comparator 18. To that end, the instantaneously given actual brake pressure at the wheel 20 to be retarded (the one wheel 20 possibly representing a plurality of wheels) is measured in the wheel brake 22, by means of a pressure sensor 24.

In the comparator 18, the design value $p_{soll}$ and the actual value $p_{Br}$ of the brake pressure are compared with each other and a signal depending on the result of the comparison is applied to a brake pressure booster control 26. Thereupon the brake pressure booster control 26 controls a brake pressure booster 28 which is arranged in per se known manner between the pedal 10 and the brake 22. The brake pressure booster control 26, for instance, operates a specific, electromagnetically operable valve of the brake pressure booster 28 (cf. DE 39 43 002 A1) so that the hydraulic pressure produced by the brake pressure booster 28 in the brake 22 either is increased or reduced, depending on the result of the comparison made in the comparator 18. More specifically: If the comparison between the design value $p_{soll}$, which results from the actuating speed of the pedal 10, and the actual value $p_{Br}$ of the brake pressure, which is measured by the sensor 24, shows that the design value is greater than the actual value, then the brake pressure booster control 26 provides such a signal that the brake-pressure raising effect of the brake pressure booster 28 will be strengthened until the actual value equals the design value. On the other hand, if the comparison shows that the design value is smaller than the actual value, the adjustment of the brake pressure booster 28 is made such that the brake pressure is increased less.

The method described above, and the apparatus according to FIG. 1 by which this method is carried out, are suited to provide a favorable build-up of brake pressure at the wheel brake 22, particularly upon very sudden and vigorous brake applicabooster 28 will be strengthened until the actual value equals the design value. On the other hand, if the comparison shows that the actual value is greater than the design value, the adjustment of the brake pressure booster 28 is made such that the brake pressure is increased less.

The method described above, and the apparatus according to FIG. 1 by which this method is carried out, are suited to provide a favorable build-up of brake pressure at the wheel brake 22, particularly upon very sudden and vigorous brake application in dangerous situations, overcoming mistakes (which lead to too little brake pressure) often made in practice by drivers. This is achieved by virtue of stronger brake pressure boosting being adjusted by means of the brake pressure booster 28, than in conventional braking, due to the design values associated with the individual actuating speeds of the brake pedal. As a consequence, not only the brake pressure build-up is accelerated, but also a higher brake pressure level is reached. ABS equipment, in conventional manner, prevents that the brake pressure level becomes too high.

What is claimed is:

1. A brake pressure control method in a vehicle brake system equipped with an electronically adjustable brake pressure booster, with which an actuating speed of a brake pedal is determined and brake pressure boosting effected in response to the same, the method comprising the steps of:

constantly associating a stored brake pressure design value with a respective instantaneous actuating speed of the brake pedal during a braking operation;

measuring an actual brake pressure value and comparing the actual brake pressure value with the design value; and adjusting a pressure originating from the brake pressure booster in response to a result of the comparison between the design value and the actual value, so that the actual value converges to the corresponding design value.

\* \* \* \* \*